(12) United States Patent
Mullin

(10) Patent No.: US 9,955,715 B1
(45) Date of Patent: May 1, 2018

(54) MANUFACTURE OF VEGETABLE-BASED CLUSTER-TYPE SNACK-FOOD PRODUCT WITH LOW SUGAR BINDER

(71) Applicant: BIOSILO FOODS, INC., La Jolla, CA (US)

(72) Inventor: Keith Alan Mullin, La Jolla, CA (US)

(73) Assignee: Biosilo Foods, Inc, La Jolla, CA (US)

( * ) Notice: Subject to any disclaimer, the term of this patent is extended or adjusted under 35 U.S.C. 154(b) by 0 days. days.

(21) Appl. No.: 15/083,159

(22) Filed: Mar. 28, 2016

Related U.S. Application Data

(63) Continuation-in-part of application No. 14/303,243, filed on Jun. 12, 2014.

(60) Provisional application No. 61/833,924, filed on Jun. 12, 2013, provisional application No. 62/139,688, filed on Mar. 28, 2015, provisional application No. 62/275,375, filed on Jan. 6, 2016.

(51) Int. Cl.
  *A23L 1/164* (2006.01)
  *A23L 19/00* (2016.01)
  *A23P 10/20* (2016.01)

(52) U.S. Cl.
  CPC ............. *A23L 19/05* (2016.08); *A23P 10/20* (2016.08); *A23V 2002/00* (2013.01)

(58) Field of Classification Search
  CPC ........ A23L 1/212; A23L 1/2123; A23L 1/217; A23L 1/5022
  USPC .................. 426/615, 573, 445, 519
  See application file for complete search history.

(56) References Cited

U.S. PATENT DOCUMENTS

| 2,635,792 | A | 4/1953 | Amand et al. |
| 3,323,922 | A | 6/1967 | Durst |
| 3,964,609 | A | 6/1976 | Perrella |
| 3,992,555 | A | 11/1976 | Kovacs |
| 4,095,712 | A | 6/1978 | Perrella |
| 5,578,336 | A | 11/1996 | Monte |
| 5,747,080 | A | 5/1998 | Lemke et al. |
| 5,971,613 | A | 10/1999 | Bell |
| 6,202,904 | B1 | 3/2001 | Casciano |
| 6,207,207 | B1 | 3/2001 | Belzowski et al. |
| 6,273,299 | B1 | 8/2001 | Hernowitz et al. |
| 6,558,718 | B1 | 5/2003 | Evenson et al. |
| 2002/0039609 | A1 | 4/2002 | Bezek et al. |
| 2003/0031760 | A1* | 2/2003 | Hansa ............ A23L 7/101 426/93 |
| 2003/0082277 | A1 | 5/2003 | Sokhey et al. |

(Continued)

*Primary Examiner* — Helen F Heggestad
(74) *Attorney, Agent, or Firm* — Tillman Wright, PLLC; James D. Wright; David R. Higgins

(57) ABSTRACT

A high-volume method of manufacturing a vegetable-based cluster-type snack-food product with a low-sugar binder, carried out in a manufacturing line, includes inputting a supply of a vegetable cluster component to a manufacturing line, inputting a supply of a binder component to the manufacturing line, mixing a quantity of the supply of the binder component together with a quantity of the supply of the vegetable cluster component to produce a mixture, and manipulating the mixture of binder component and vegetable cluster component to produce a plurality of vegetable snack-food product clusters. The vegetable cluster component predominantly includes whole or pieces of savory and/or salty culinary vegetables. The binder component is produced predominantly from soluble fiber. The vegetable snack-food product clusters are bound together by the binder component.

9 Claims, 17 Drawing Sheets

(56) References Cited

U.S. PATENT DOCUMENTS

| | | |
|---|---|---|
| 2003/0172626 A1 | 8/2003 | Kohl et al. |
| 2003/0198713 A1 | 10/2003 | Clark et al. |
| 2004/0091183 A1 | 5/2004 | Dierl et al. |
| 2004/0175482 A1 | 9/2004 | Casey et al. |
| 2004/0185149 A1 | 9/2004 | Prosise et al. |
| 2005/0017029 A1 | 1/2005 | Laverdure |
| 2005/0244510 A1 | 11/2005 | Smith |
| 2006/0052438 A1 | 3/2006 | Ho et al. |
| 2006/0280835 A1 | 12/2006 | Jani et al. |
| 2007/0237880 A1* | 10/2007 | Coleman ............... A23L 7/126 426/620 |
| 2008/0317907 A1* | 12/2008 | Thomas ............... A23G 3/0089 426/93 |
| 2009/0123610 A1 | 5/2009 | Mullin |
| 2011/0086145 A1* | 4/2011 | Rodriguez Campisto ............ A23B 7/0205 426/263 |
| 2012/0088009 A1 | 4/2012 | Mullin |
| 2012/0213887 A1 | 8/2012 | Mullin |

* cited by examiner

MANUFACTURE OF VEGETABLE-BASED CLUSTER-TYPE SNACK-FOOD PRODUCT WITH LOW SUGAR BINDER

CROSS-REFERENCE TO RELATED APPLICATION

The present application is:

(a) a U.S. continuation-in-part patent application of, and claims priority under 35 U.S.C. § 120 to, U.S. nonprovisional patent application Ser. No. 14/303,243, filed Jun. 12, 2014, a copy of which is attached hereto as Appendix C, which patent application is incorporated by reference herein, and which patent application is a U.S. nonprovisional patent application of, and claims priority under 35 U.S.C. § 119(e) to, U.S. provisional patent application Ser. No. 61/833,924, filed Jun. 12, 2013, which provisional patent application is incorporated by reference herein;

(b) a U.S. nonprovisional patent application of, and claims priority under 35 U.S.C. § 119(e) to, U.S. provisional patent application Ser. No. 62/139,688, filed Mar. 28, 2015, a copy of which is attached hereto as Appendix A, and which provisional patent application is incorporated by reference herein; and (c) a U.S. nonprovisional patent application of, and claims priority under 35 U.S.C. § 119(e) to, U.S. provisional patent application Ser. No. 62/275,375, filed Jan. 6, 2016, a copy of which is attached hereto as Appendix B, and which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to food manufacturing, and, in particular, to the manufacture of vegetable snack-foods and the high volume production of a vegetable based snack food product with fiber reinforcement.

Background

Shelf-stable vegetables or preserved vegetables have been used for years in snacks. Examples include Alive & Radient's Kale Chips, Crunchies', Rhythm Food's Kale Chips, Open Nature's Veggie Chips or Seapoint Farms Dry Roasted Edamame and dried fruits. To render shelf-stable vegetables or fruits, these snack products are made from dried, freeze dried, dry roasted or vacuum fried methods or processes. A problem with these conventional shelf-stable vegetable snack products is that they are not manufactured in a cluster, where such a cluster is comprised of a plurality of vegetables. The majority of the above mentioned vegetable snack products are topically seasoned with flavoring such as, ranch, sea salt or Barbeque flavorings.

It can also be appreciated that snack clusters and snack cluster products have been in use for years. Nut clusters and granola clusters such as General Mills Honey Nut Clusters®, UDI's Active Granola Clusters, TRUENORTH® nut clusters, Nature Valley nut clusters, Mrs. May's Rounds™ nut clusters, and Rickland Orchards fruit and granola clusters are typical embodiments of conventional snack clusters.

A variety of high volume manufacturing processes are used to produce such snack clusters. For example, U.S. Patent Publication No. 2005/0129817 describes a process for manufacturing a cereal cluster. U.S. Patent Publication No. 2005/0042357 and U.S. Pat. No. 4,451,488 describe a method for making a granola food bar. U.S. Pat. No. 7,887,863 B2 describes methods for making cubed nut clusters. U.S. Pat. No. 4,010,284 A describes a method for forming nut clusters and U.S. Patent Publication No. 2011/0104356 describes a nut cluster binder and method of manufacture. U.S. Pat. No. 2,847,311 describes a process for producing confections. U.S. Pat. No. 3,868,471 describes a process to manufacture ready to eat cereal products. U.S. Pat. No. 6,837,682 describes a method of preparation for nutrient clusters for food products. U.S. Pat. No. 3,890,453 describes forming shaped potato snack pieces from potato dough.

Furthermore, such clusters have no methods or means to be manufactured with real vegetables in a High Volume Manufacturing Process.

A significant shortcoming of conventional snack clusters, like the snack clusters mentioned above, is that their base ingredients only include nuts, fruits, and/or or grains, and do not include shelf-stable vegetables. Known snack clusters are unfortunately not made with shelf-stable vegetables, and are not enrobed with an outer layer that contains such vegetables. Another problem with conventional snack clusters is they are not made with vegetables and not made with additive coatings that use a vegetable cluster as a base. Another problem with conventional snack clusters is that they only are made in cluster formats without structural reinforcement, and are not made in a thin format, with a minimum section of 3 mm and a maximum section of 25 mm, while having a length or diameter of a minimum of 20 mm and a maximum of 100 mm. Another problem with conventional snack clusters is that they are not made with non-GMO ingredients.

Another problem with conventional snack clusters are they provide no or little dietary or nutritional benefits that are provided by vegetables. Another problem with conventional snack clusters are that they are not provided with vegetables in a cluster format and in a package or method of use which allows for on-the-go consumption of vegetables.

While the above referenced snack clusters and manufacturing methods may be suitable for the particular purpose to which they address to make nut and cereal clusters, they are not as suitable for a method of manufacture of a vegetable cluster snack food product that are;

(i) comprised of a plurality of various shelf-stable vegetables;
(ii) have a minimum thickness of 3 mm and a maximum thickness of 25 mm;
(iii) have a length and diameter of a minimum of 20 mm and a maximum of 100 mm;
(iv) use a binding mixture that has less than 75 grams of sugar per 100 grams of syrup, more preferably between 4 and 50 grams of sugar per 100 grams of syrup, and still more preferably between 10 and 20 grams of sugar per 100 grams of syrup;

(v) and has a structural reinforcement system made from soluble fiber;

(vi) that may use tree nuts as additional reinforcement members;

(vii) in a high production manufacturing process.

However, one particular difficulty in creating vegetable-based cluster-type food products is that conventional cluster-type food products are mostly sweet, rather than savory or salty, and are able to rely upon the crystallization of the sugar ingredients (short-chain, soluble carbohydrates) of the binder component that is used to hold the nuts and grains together and to form a structure. More particularly, it is the crystallization of the sugar glucose polymers that historically provides the bonds between the other ingredients, thus providing the structure of the cluster. This method would be similar to coating individual parts with a resin, plastic resin or epoxy resin, which then hardens to create a solid product.

Because savory and/or salty foods have less sugar than traditional cluster food products, it is much more difficult to create cluster-type food products that are based, for example, upon vegetables, since one can't use high sugars in the resin method described above, to provide product structure. Additionally, thinner and lengthier dimensions of a snack cluster cannot be achieved using low sugars. Thus, in order to manufacture a savory snack product, a new and innovative manufacturing process has been developed as described herein.

Many snack products are typically thin, such as crackers or potato chips, such thinness is a desirable palatability attribute of many snack products. Conventional cluster-type food products are not thin, nor have a dimension that can be as little as 3 mm thick while also have a span or length of 100 mm.

The present invention uses structural reinforcement in the form of soluble corn fiber, which may be non-GMO soluble corn fiber, that enables the length or diameter of the end product snack piece to be 100 mm in length, while having a thin cross section as little as 3 mm. In some cases, tree nuts or shaped tree nuts can provide additional structure reinforcement of vegetable parts with a binder that is lower in sugar.

This method of snack food manufacture would be similar to adding rebar to concrete, where the rebar provides structural reinforcement to the end product which is included in the mixture, to achieve the desired physical properties of the finished product, while using less concrete and achieve similar or greater structural properties.

In these respects, the process of manufacture of a non-GMO vegetable-based cluster-type snack-food product with fiber reinforcement according to the present invention substantially departs from the conventional concepts and designs of the prior art, and in so doing provides a vegetable based snack food product with fiber reinforcement which is manufactured in a high volume manufacturing process.

SUMMARY OF THE PRESENT INVENTION

Broadly defined, the present invention according to one aspect is a high-volume method of manufacturing a vegetable-based cluster-type snack-food product with fiber reinforcement; which may be non-GMC) fiber reinforcement, carried out in a manufacturing line, including: inputting a supply of a vegetable cluster component to a manufacturing line, wherein the vegetable cluster component predominantly includes whole or pieces of savory and/or salty culinary vegetables; inputting a supply of accessory ingredients to a manufacturing line, wherein the accessory ingredients provide taste, preservative, filler or stabilizer for the end product, inputting a supply of a binder component to the manufacturing line, wherein the binder component is reinforced with soluble fiber, wherein the fiber acts as structural reinforcement for the end product; mixing a quantity of the supply of the binder component together with a quantity of the supply of the vegetable to produce a mixture; manipulating the mixture of binder component, accessory component and vegetable cluster component to produce a plurality of vegetable snack-food product clusters that can have a section as little as 3 mm and a diameter up to 100 mm; wherein the vegetable snack-food product clusters are bound together by the fiber-reinforced binder component. In some cases, tree nuts can be added to the supply of vegetable cluster components to additionally provide structural decking or structural reinforcement for the final produced snack-food product clusters.

In a feature of this aspect, the vegetable cluster component includes pieces of leafy green vegetables. In a further feature, the leafy green vegetables include at least one of spinach, kale, or broccoli.

In another feature of this aspect, the method further includes a step of heating the binder component to facilitate binding the vegetable snack-food product clusters together. In further features, the heating step includes heating the binder component to at least 100 degrees F.; the heating step is carried out prior to the mixing step; and/or the heating step is carried out during the mixing step.

In another feature of this aspect, the binder component includes an isolated soluble fiber. In further features, the binder component includes soluble corn fiber; the binder component further includes a quantity of a glucose syrup; and/or the binder component further includes a quantity of brown rice syrup.

In another feature of this aspect, the method further includes a step of adding soluble fiber to the binder component to reinforce the binder component with fiber materials for binding the vegetable snack-food product clusters together, enabling the ability to create the vegetable snack-food product cluster with a 3 mm section and up to 100 mm in diameter.

In further features, the heating step includes heating the binder component to at least 100 degrees F.; the heating step is carried out prior to the mixing step; and/or the heating step is carried out during the mixing step.

In another feature of this aspect, in the step of inputting a supply of a vegetable cluster component to the manufacturing line; the vegetable cluster component predominantly includes whole or pieces of a plurality of different savory and/or salty culinary vegetables.

In another feature of this aspect, the method further includes a step of inputting a supply of a non-vegetable cluster component to the manufacturing line, the non-vegetable cluster component includes whole or pieces of culinary fruits, grains, cereals, nuts, and/or seeds, and the mixing step includes mixing a quantity of the supply of the binder component together with a quantity of the supply of the vegetable cluster component and a quantity of the supply of the non-vegetable cluster component to produce the mixture.

In another feature of this aspect, the tree nut component includes shaped pieces of tree nuts.

In a further feature, the tree nut component may include more than one type of tree nut.

In a further feature, the tree nuts include at least one tree nut such as almonds, Brazil nuts, cashews, chestnuts, filberts/hazelnuts, macadamia nuts, pecans, pistachios, pine nuts, or walnuts.

In another feature of this aspect, the method further includes a step of placing the tree nut component in a horizontal layered format within vegetable snack-food product cluster, thus providing additional structural support for the end product as a structural deck.

In further features, the horizontal layering of tree nuts within the vegetable snack-food product; is performed during forming the snack-food cluster.

In further features, the tree nut component predominantly includes almonds sliced into a disk format shapes; where the disk shaped, sliced almond pieces are placed in a layered, overlapping or adjacent format, where such tree nut disks provides product reinforcement which the disk are placed horizontally within the vegetable snack-food product during manufacture for structural support of the final produced snack product.

In another feature of this aspect, in the step of inputting a supply of accessory ingredient component to the manufacturing line, the accessory ingredient component can include spices, flavoring, preservatives, filler or stabilizer for the end product.

In another feature of this aspect and manufacturing method, all the grown ingredient products of the vegetable cluster are grown without the use of pesticides and are organic.

In another feature of this aspect, the manipulating step includes manipulating the mixture of binder component and vegetable cluster component to produce a plurality of vegetable snack-food product cluster pieces. In a further feature, the cluster pieces are rectangular-shaped, hexahedrally-shaped, disk-shaped, spherically-shaped, or irregularly-shaped and have a section dimension down to 3 mm and up to 100 mm in diameter.

In another feature of this aspect, the manipulating step includes manipulating the mixture of reinforced binder component, the tree nut component and vegetable cluster component to produce a plurality of vegetable snack-food product clusters that have a section dimension down to 3 mm and up to 100 mm in diameter.

In another feature of this aspect, the method further includes: inputting a supply of an additive to the manufacturing line; and including the additive in or on the vegetable snack-food product clusters. In further features, the mixing step includes mixing a quantity of the supply of the reinforced binder component together with a quantity of the supply of the vegetable cluster component and a quantity of the supply of the additive to produce the mixture; and/or the manipulating step includes manipulating the mixture of the reinforced binder component and vegetable cluster component to produce a plurality intermediate product clusters and, thereafter, layering, enrobing, or covering the intermediate product clusters with a quantity of the supply of the additive.

In another feature of this aspect, the vegetable snack-food product clusters are bound together substantially by only using a glucose syrup that has between 4 and 75 grams of sugar per 100 grams of syrup, more preferably between 4 and 50 grams of sugar per 100 grams of syrup, and still more preferably between 10 and 20 grams of sugar per 100 grams of syrup, and includes a soluble fiber that is added for structural reinforcement.

In another feature of this aspect, the vegetable snack-food product clusters are structurally reinforced by, disk shaped tree nuts.

In another feature of this aspect, the vegetable snack-food product clusters have a section dimension down to 3 mm and up to 100 mm in diameter.

In another feature of this aspect, the end product is a cluster of vegetables, the cluster may be used as a snack or as a condiment or garnish, such as being added to salads as a salad topper. Once a user has made their traditional salad, the end product would be added to the salad similar to a crouton.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
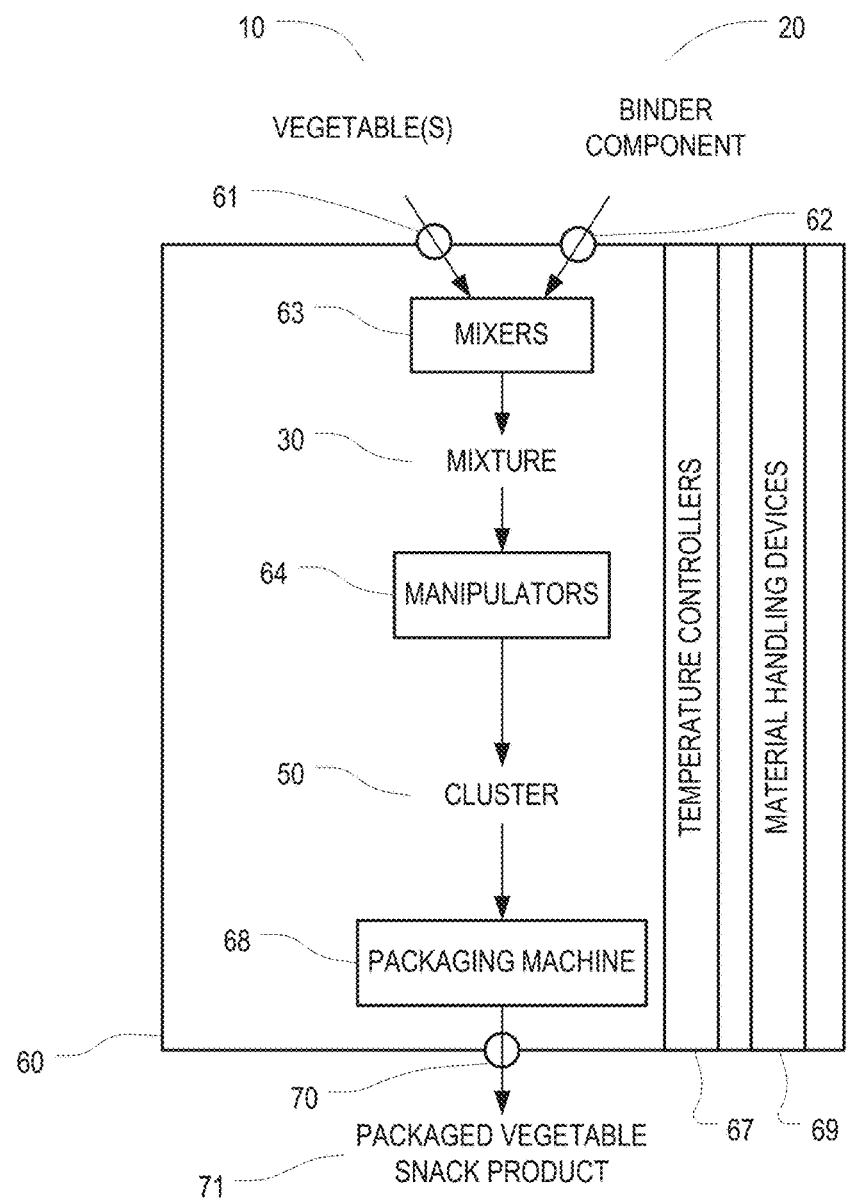
FIG. 1 is a flowchart illustrating a high volume process of manufacturing vegetable snack food products in accordance with one or more preferred embodiments of the present invention.
Figure 2:
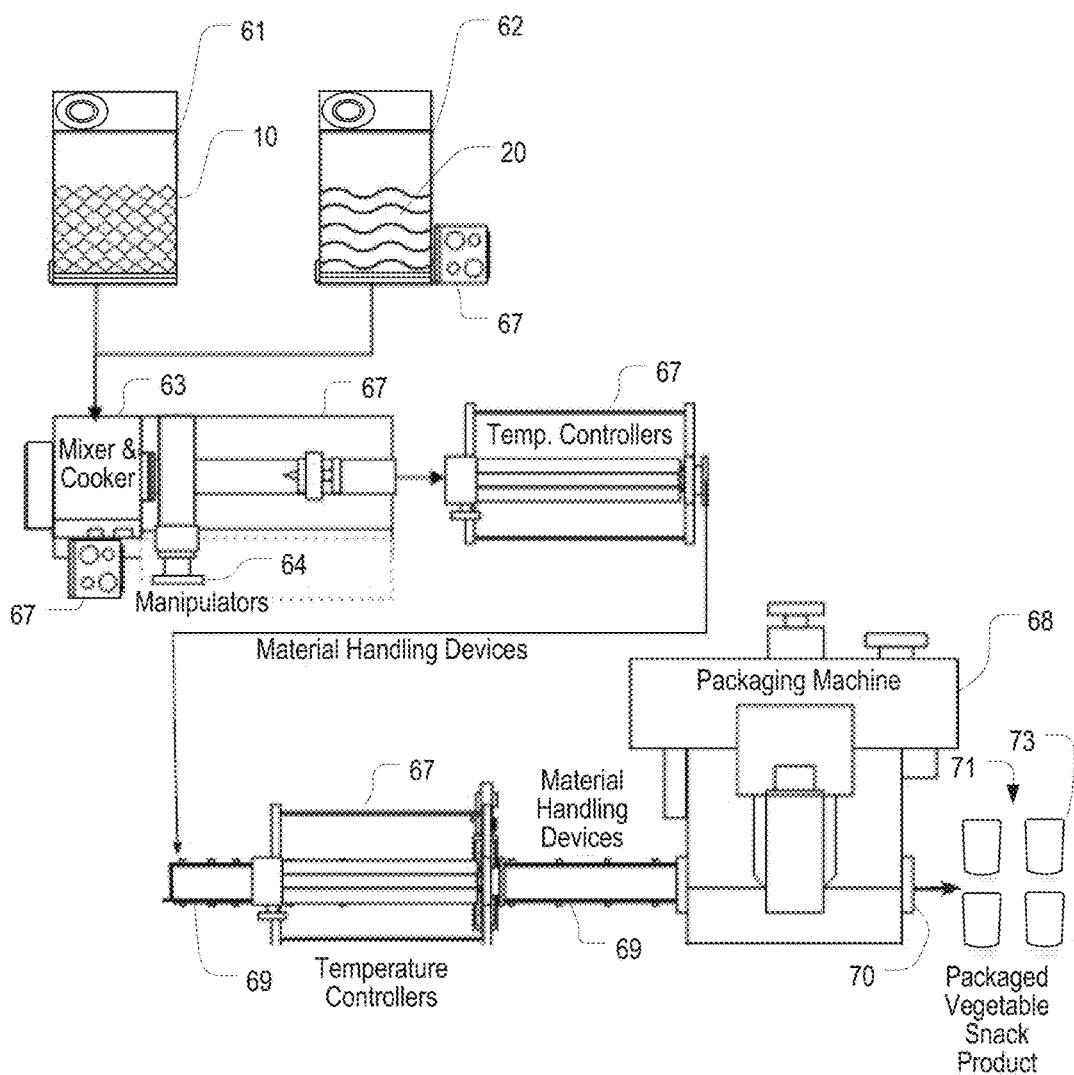
FIGS. 2, 3, 4, and 5 are block diagrams of systems for carrying out the process of FIG. 1 in accordance with one or more preferred embodiments of the present invention.
Figure 3:
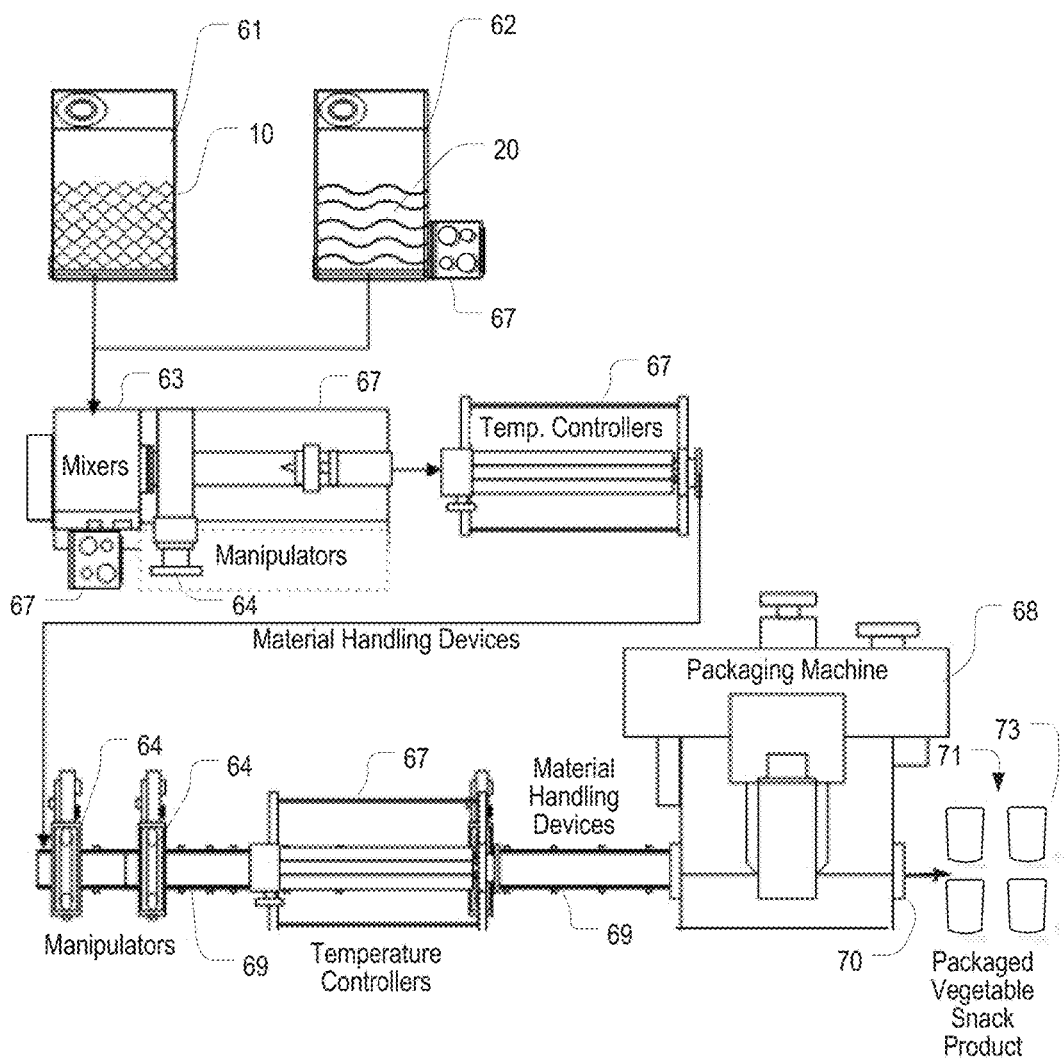
Figure 4:
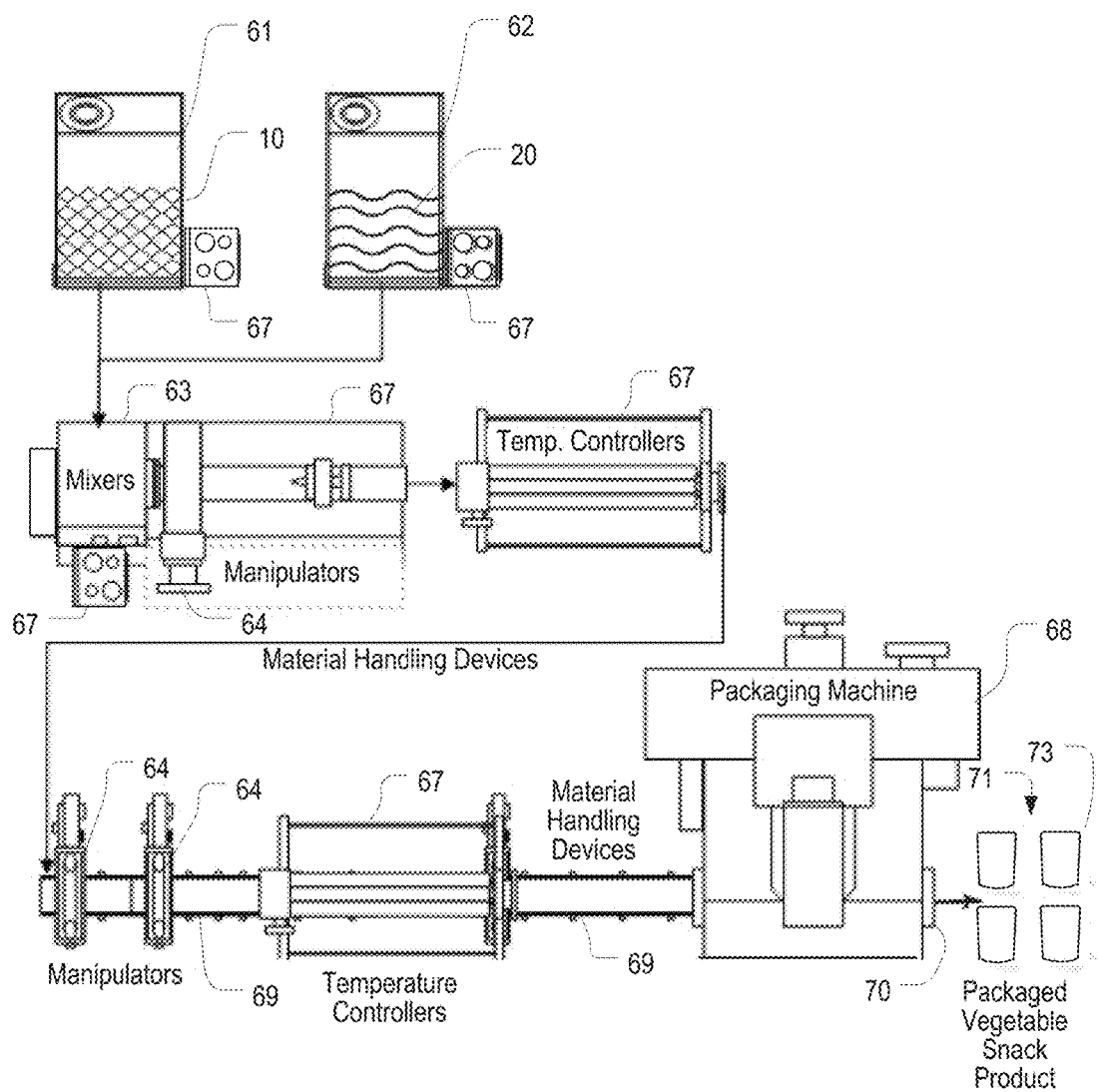
Figure 5:
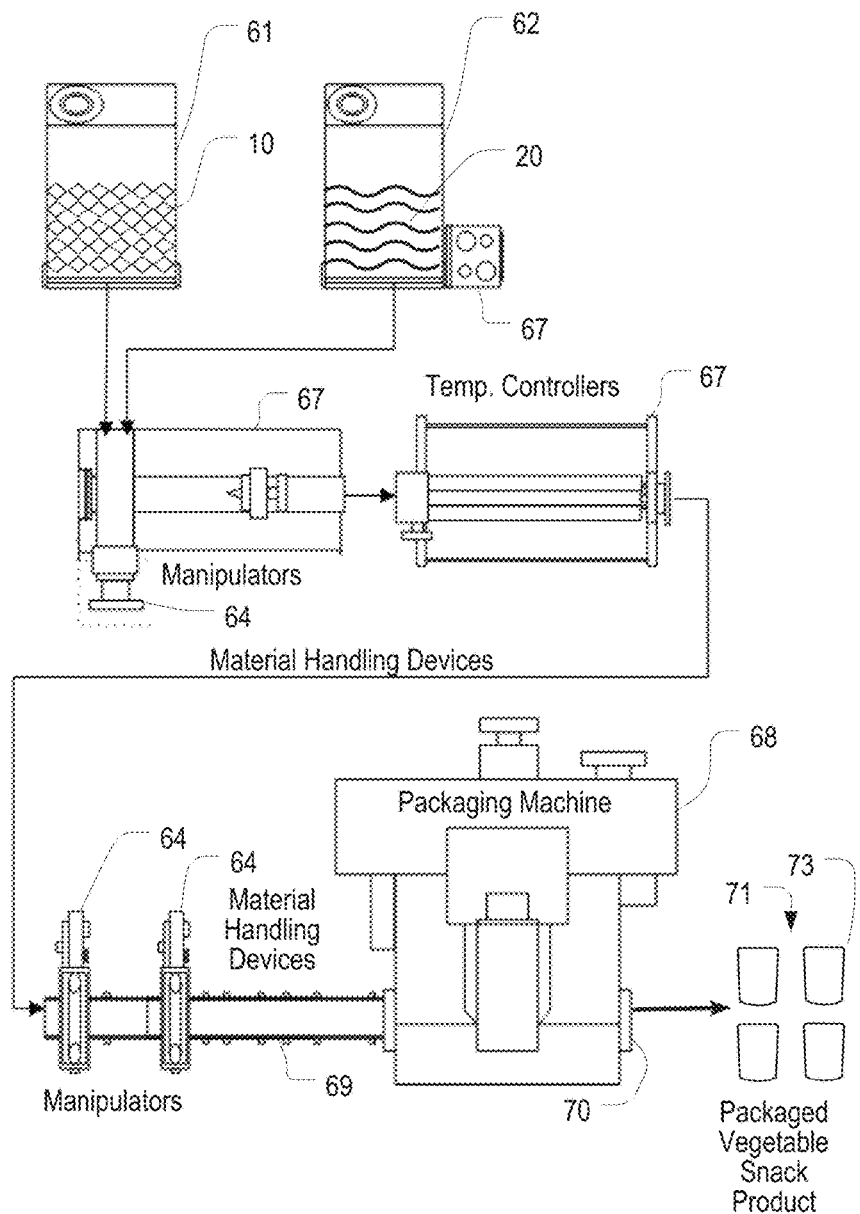

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein as understood by the Ordinary Artisan based on the contextual use of such term differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiments is merely exemplary in nature and is in no way intended to limit the invention, its implementations, or uses.

Overview

FIG. 1 is a flowchart illustrating a high volume process 60 of manufacturing vegetable snack food products in accordance with one or more preferred embodiments of the present invention. As shown therein, a vegetable component 10 and one or more binder component 20 are combined and processed via a plurality of devices and/or processes to produce vegetable clusters 50 that are packaged to make a saleable vegetable snack product 71.

FIGS. 2, 3, 4, and 5 are block diagrams of systems 100,101,102,103 for carrying out the process 60 of FIG. 1 in accordance with one or more preferred embodiments of the present invention. Each system 100,101,102,103 is an assembly of powered machines, mechanisms, equipment and devices that when operated together, produce a packaged vegetable snack product 71 automatically and in a continuous manner. As shown therein, each system 100,101, 102,103 includes a vegetable input 61, a binder input 62, mixers 63, manipulators 64, a packaging machine 68, and a vegetable snack-food product output 70, as well as temperature controllers (such as ovens, heaters or coolers) 67 and material handling devices 69. The high volume manufacturing process 60 may also include an additive machine 65 and one or more additive material or mixture inputs 66, as described below.

Figure 6:
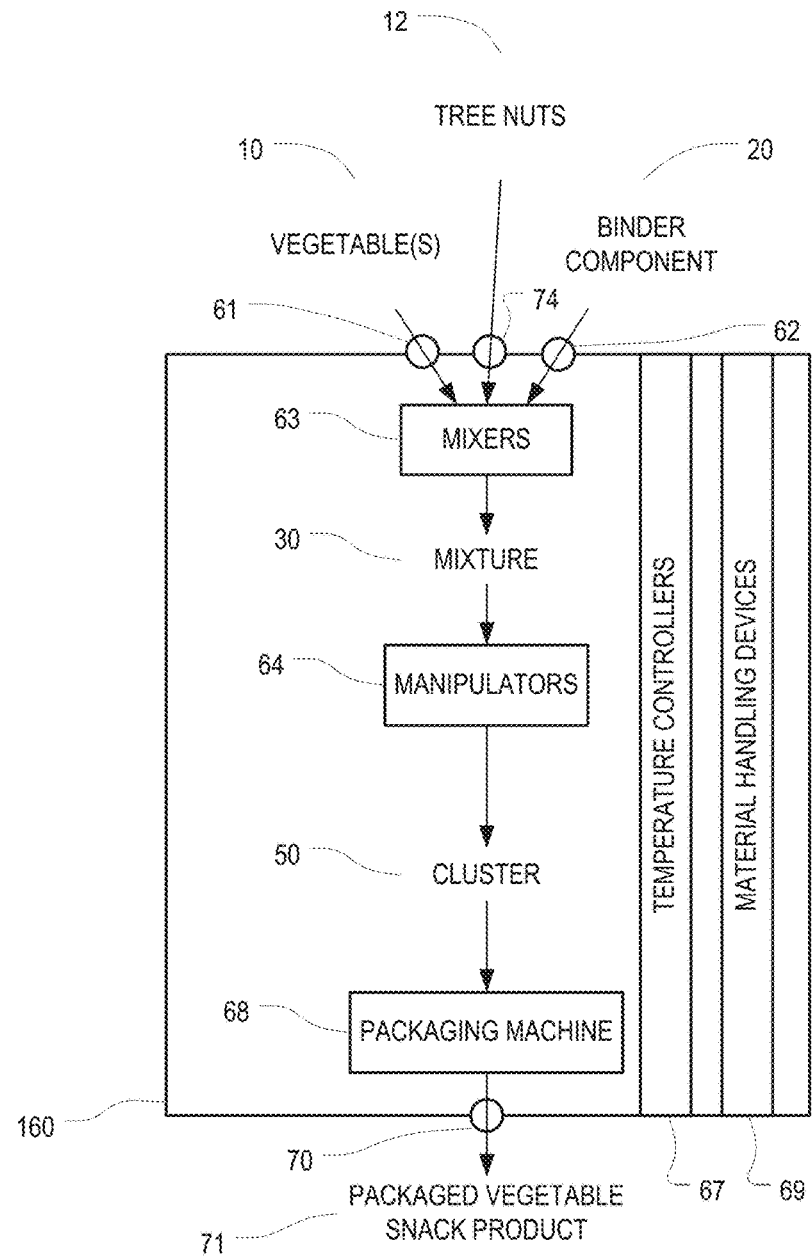
FIG. 6 is a flowchart illustrating another high volume process of manufacturing vegetable snack food products in accordance with one or more preferred embodiments of the present invention.
Figure 7:
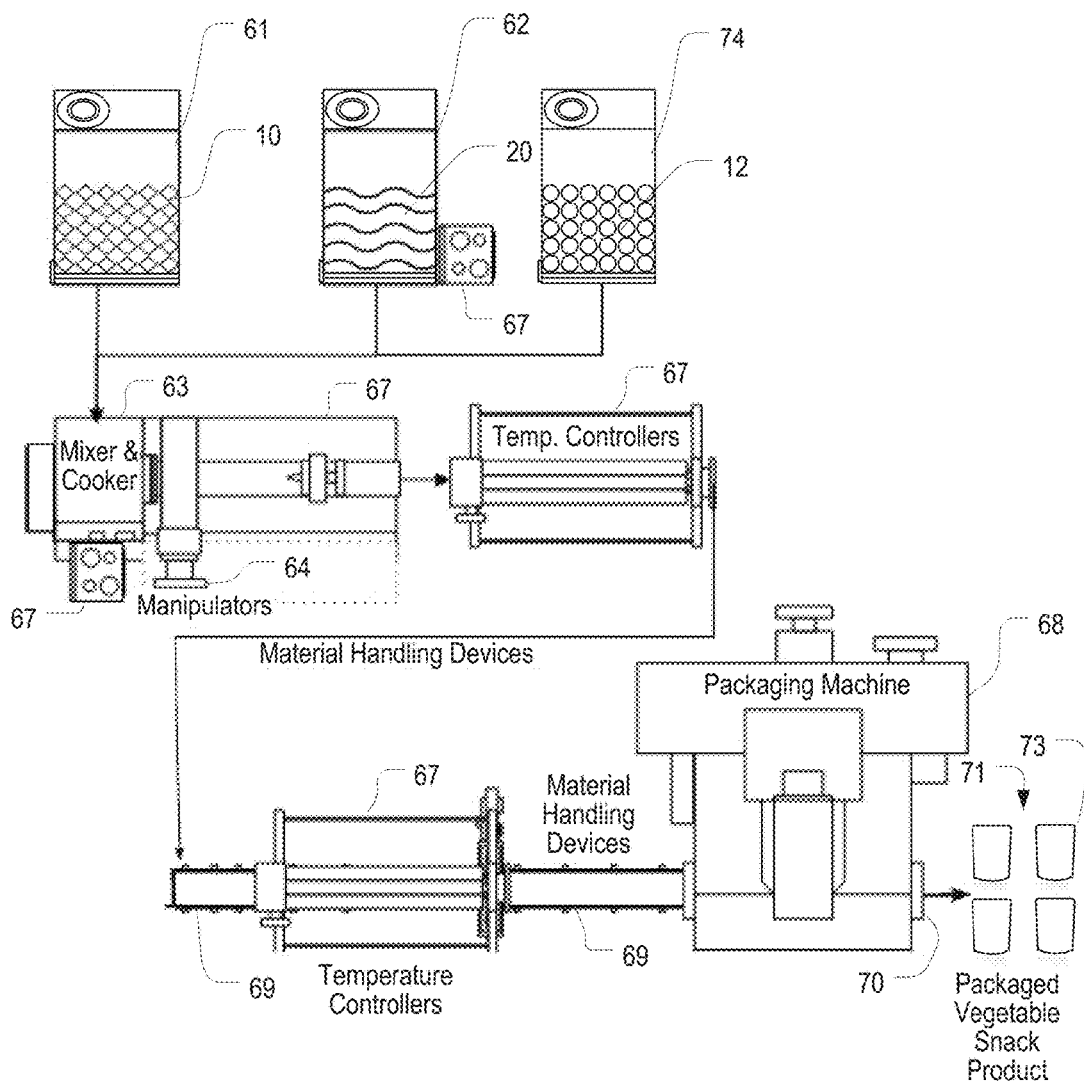
FIG. 7 is a block diagrams of a system for carrying out the process of FIG. 6.

In at least some embodiments, the high volume process 60 of FIG. 1 may be supplemented through the use of a sliced tree nut component 12 to provide structural reinforcement to the vegetable clusters as structural decking. In this regard, FIG. 6 is a flowchart illustrating another high volume process 160 of manufacturing reinforced vegetable snack food products in accordance with one or more preferred embodiments of the present invention, and FIG. 7 is a block diagram of a system 200 for carrying out the process 160 of 6. As shown therein, a tree nut component 12 is provided via tree nut input 74.

Figure 8:
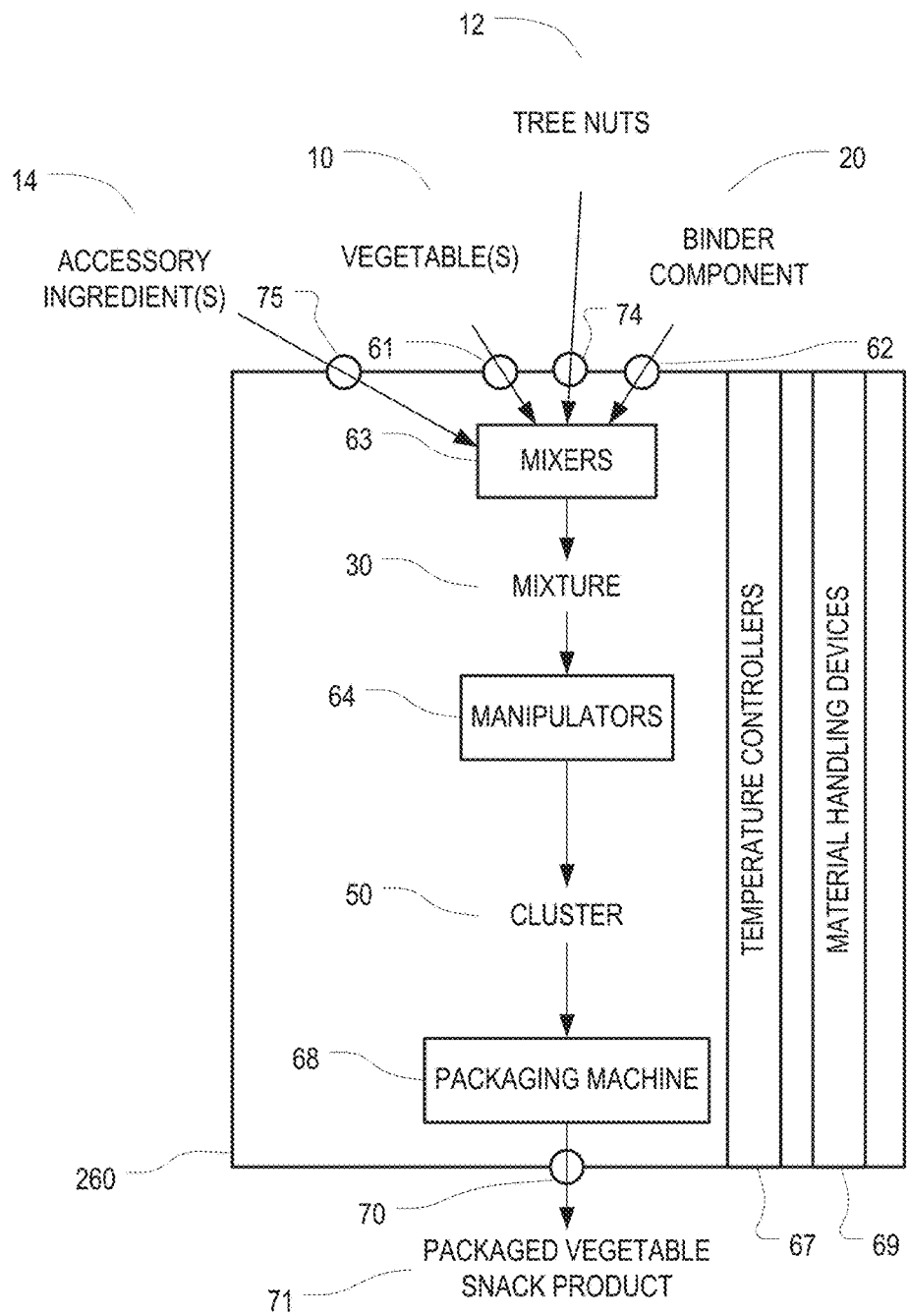
FIG. 8 is a flowchart illustrating another high volume process of manufacturing vegetable snack food products in accordance with one or more preferred embodiments of the present invention.
Figure 9:
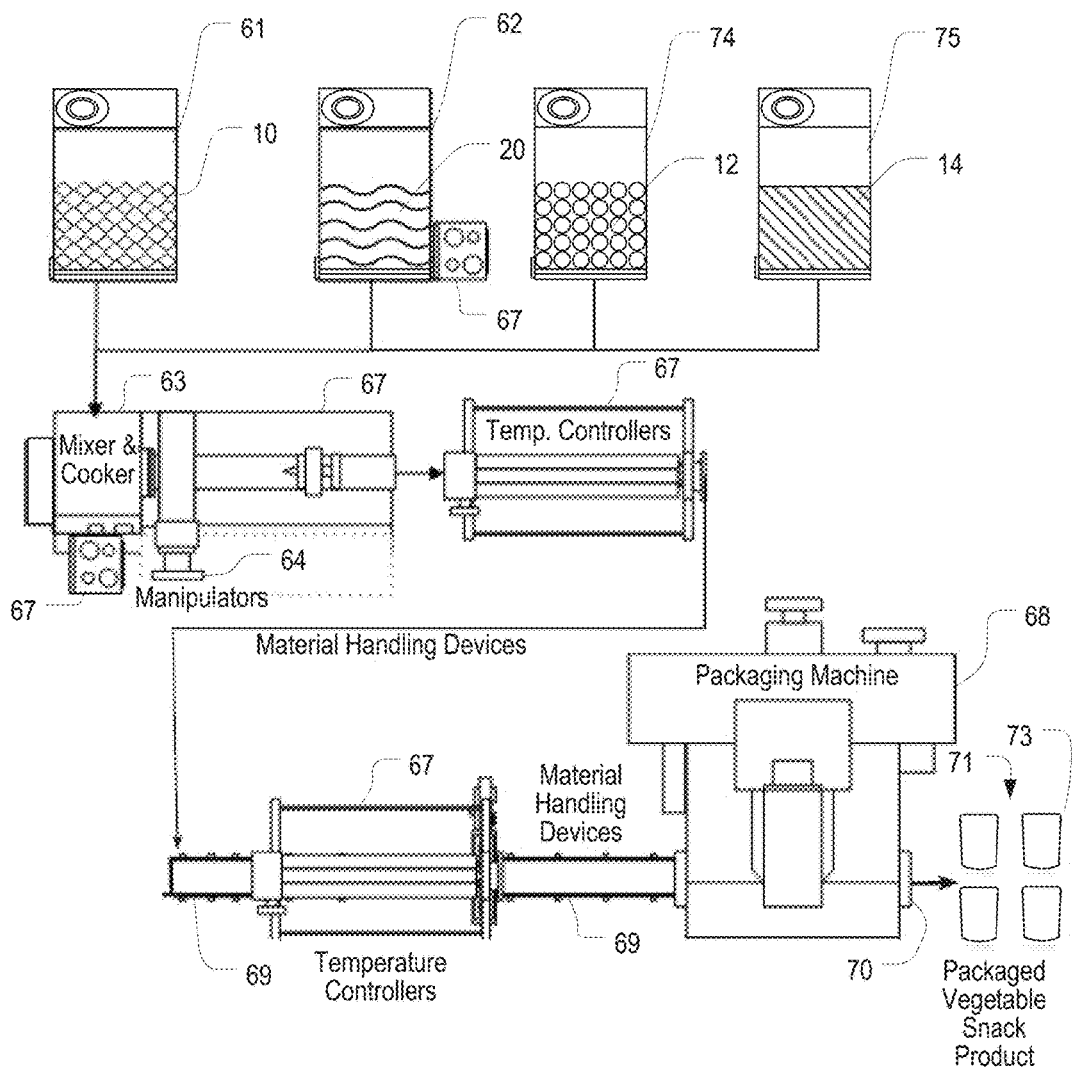
FIG. 9 is a block diagram of a system for carrying out the process of FIG. 8.

Also in at least some embodiments, the high volume process 160 of FIG. 6 (or FIG. 1) may be supplemented by including accessory ingredients 14 in the combination with the vegetable component 10, and optional tree nut component 12, and binder component 20. In this regard, FIG. 8 is a flowchart illustrating another high volume process 260 of manufacturing vegetable snack food products in accordance with one or more preferred embodiments of the present invention, and FIG. 9 is a block diagram of a system 300 for carrying out the process 260 of FIG. 8. As shown therein, accessory ingredient(s) 14 are provided via accessory ingredient input 75.

The processes 60,160,260, systems 100,101,102,103,200, 300, and various alternative embodiments are more fully described below.

Vegetable Cluster Component

The vegetable cluster component 10 includes whole or pieces of savory or salty culinary vegetables. In at least some embodiments, it is preferred for the vegetable cluster component 10 to include whole or pieces of one or more leafy vegetable such as kale, spinach, or broccoli, but the vegetable cluster component 10 may additionally, or in some cases alternatively, include peas, potatoes, tomatoes, broccoli stems, cauliflower, carrots, beets, or the like. In at least some embodiments, the vegetable cluster may include one type of vegetable, such as just cauliflower. In at leak some embodiments, the vegetable cluster component 10 are preserved or rendered shelf-stable via food industry preservation methods.

In various embodiments, the vegetable cluster component 10 may include whole vegetables, whole vegetable elements 11 (such as cut whole vegetables), or smaller elements of vegetables, including particles, pieces, flakes, dices, granules or powders (particles) of preserved vegetables. In some embodiments, all of the vegetables in the vegetable cluster component 10 are of a single type, while in other embodiments, the vegetable cluster component 10 include vegetables of different types. In the latter embodiments, one type of vegetable may be mixed or blended with other vegetables. The combinations and ratios of vegetables in the vegetable cluster component 10 can be optimized for consumer preferences, taste, processing methods, supply and economics. The materials in the vegetable cluster component 10 may be obtained in a shelf-stable format, or raw vegetables may be obtained and processed to such a shelf-stable format. Shelf-stable formats or food industry vegetable preservation methods include but are not limited to; dehydration, vacuum fried, freeze dried or micro-dried methodologies. The vegetable cluster component 10 may include any single element or combination mixed together of the above.

In at least some embodiments, the vegetable component 10 may also include or be combined with a non-vegetable cluster component. The mixing or other combining process may occur prior to the manufacturing process, during the manufacturing process, or both. Suitable non-vegetable cluster components may include botanical fruits, grains, cereals, nuts, seeds, and others. In various embodiments, a non-vegetable component may include almonds, pistachios, sunflower seeds, chic seeds, raisins, cranberries, strawberries, cherries, blackberries, lemons, apples, peaches, apricots, soy beans, rice crisps, quinoa, mushrooms, or the like. The combinations and ratios of vegetables to non-vegetables can be optimized for consumer preferences, taste, processing methods, supply and economics. The non-vegetable ingredients may be obtained in a shelf-stable format, or raw (non-shelf-stable) ingredients may be obtained and processed to such a shelf-stable format. Shelf-stable formats or food industry preservation methods include but are not limited to; dehydration, vacuum fried, freeze dried or micro-dried methodologies.

Binder Component

The binder component 20 is an edible material or substance that holds the materials of the vegetable cluster component 10 together to form a cluster 50. The binder component 20 may include a glucose syrup in combination with a soluble fiber. The binder component 20 preferably has between 4 and 75 grams of sugar per 100 grams of syrup, more preferably between 4 and 50 grams of sugar per 100 grams of syrup, and still more preferably between 10 and 20 grams of sugar per 100 grams of syrup. A low sugar binder component 20 generally produces a sensory taste that is bland and not as sweet in taste as binders used in conventional snack clusters as well as providing health benefits (real and perceived) associated with low sugar foods. Preferably, the flavor of the binder component 20 ranges from bland to subtly sweet (preferably no more than approximately 10% of the sweetness of sugar/sucrose).

The binding syrup may be a viscous liquid consisting primarily of a solution that when hardened, holds vegetable cluster component 10 or particles of vegetable cluster component 10 together. Examples of glucose syrups suitable for use as a binding syrup may include, brown rice syrup, coconut syrup, corn syrup, chicory syrup, birch syrup, yucca syrup, tapioca syrup, cassava syrup, rice malt, an isomaltooligosaccharide mixture, a saccharide polymer or any eatable syrup mixture or powder mixture sufficient in adhesion and structure to hold together and bond the vegetable cluster component 10, optional tree nuts 12 and optional accessory ingredients 14 together in a cluster format. One glucose syrup thought to be particularly suitable for use in preferred embodiments of the present invention is a clarified brown rice syrup with total sugars of between 11 g and 55 g per 100 g of syrup, where the sugars are mostly comprised of glucose (DP1) and maltose (DP2). (One brown rice syrup contemplated for use in commercial embodiments has a dextrose equivalent (D.E., %) of 26.)

The binder component 20 preferably comprises the glucose syrup with the soluble fiber suspended therein. The soluble fiber is preferably an isolated soluble fiber, and more preferably is a soluble corn fiber. The soluble fiber is added to the binding syrup and provides structural reinforcement to the end-produced cluster piece in order to achieve various dimensional requirements of the cluster (much like the addition of rebar to concrete). The soluble corn fiber or other isolated soluble fiber is the polymer for the glucose syrup.

The structure system is reliant on the fiber structures to create clusters 50 as described below.

In at least some of these embodiments, the binder component 20 must be heated in order for it to become viscous and thoroughly bind the vegetable cluster component 10 together effectively. Preferably, the binder component 20 is heated prior to being mixed with the vegetable cluster component 10, thus increasing viscosity and making mixing easier, but in other embodiments the combined mixture is heated. In at least some preferred embodiments, the binder component 20 is heated to at least 100 degrees F.

Tree Nut Component

As described previously, a tree nut component is utilized in at least some embodiments. Use or non-use of tree nuts in the vegetable cluster snack product may depend on the desired end cluster product dimension. It has been determined that for vegetable clusters 50 that are relatively thin (4 mm to 25 mm thick), longer clusters 50 (e.g., over 60 mm in length), tree nuts may be used to provide reinforcement, while in thin clusters 50 that are shorted (e.g., less than 60 mm in length), such reinforcement may not be necessary. Suitable tree nuts may include almonds, Brazil nuts, cashews, chestnuts, filberts and other hazelnuts, macadamia nuts, pecans, pistachios, pine nuts, walnuts, and the like. In preferred embodiments, the nuts are sliced before use so as to reduce their thickness, thereby making them more suitable for use in thinner clusters 50. However, depending on the thickness of the clusters 50, the desired textural quality of the clusters, or the like, whole nuts could be used in some cases. Use of the tree nuts slices (or in whole nuts in some cases) is described below.

Accessory Ingredients

The accessory ingredients are edible materials or substance that can include spices, flavoring, preservatives, oils, fats, fillers, stabilizers, and other types of accessory ingredients, or a combination thereof.

Non-GMO Ingredients

In some preferred embodiments, the binder component 10, the optional tree nut component 12, the optional accessory ingredients 14, and the binder component 20 are all non-GMO ingredients.

Mixture

The vegetable cluster component 10, the optional tree nuts 12, the optional accessory ingredients 14, and the binder component 20 are provided to one or more mixer 63 via respective inputs 61,62,74,75. The mixers 63 are the machines, equipment or devices that mix and combine the binder component 20 with the vegetable cluster component 10, the optional tree nuts 12, and the optional accessory ingredients 14 to form a mixture 30, wherein the mixture 30 is the resultant substance when the vegetable cluster component 10 (including non-vegetable component, if applicable), the optional tree nuts 12, the optional accessory ingredients 14, and the binder component 20 are mixed and combined together. The mixture 30 then is shaped or formed by one or more manipulators 64, thus producing a plurality of vegetable snack-food product clusters 50.

The various inputs 61,62,74,75 can have a single or multiple input machines that may introduce one or a plurality of various vegetable, tree nuts, accessory ingredients, and binder component to the process 60,160,260, such as hoppers, mixers, feeders, roasters, and the like. Ovens or heaters may be used to control the temperature of the components for varied temperature, moisture content, roasting, cooking and the like. Coolers or refrigerators may be used to control the temperature of the components for varied temperature and moisture content prior to packaging.

The binder input 62 can be comprised of various tanks and vats for the holding of the binder syrup and/or other binder and for input into the high volume manufacturing process 60,160,260. Ovens or heaters may also be used to control the temperature of the binder component 20 for varied viscosity, moisture content, flow rates, cooking and the like.

The mixers 63 can have various mechanical or material handling apparatus (such as beaters, blades, whisks, agitators, etc.) to mix together the vegetable cluster component 10, the optional tree nuts 12, and the optional accessory ingredients 14 and the binder component 20 as needed to form the mixture 30 for the application as described herein. The mixture 30 may be of any format applicable to the high volume production format that is being applied. The mixture 30 may be heterogeneous or homogeneous and used in the high volume manufacturing process 60,160,260 in a cooked or frozen format, malleable or solid, pending the required methodology used to form a cluster as described herein. If tree nuts are used, the nut slices (or in some cases, whole nuts) are mixed with the vegetable component 10.

Figure 10:
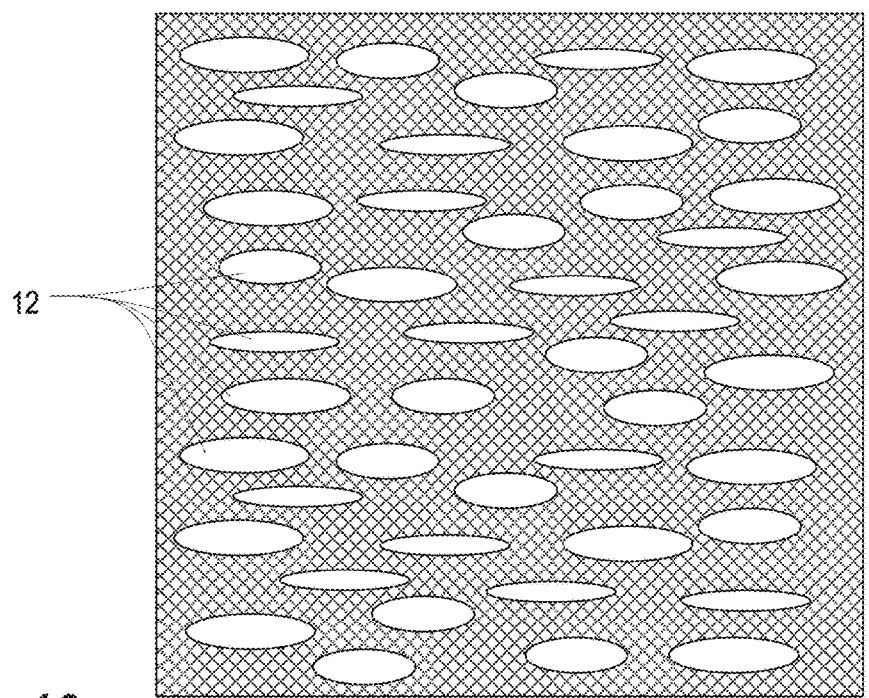
FIG. 10 is a top schematic view of a section of a rolled-out mixture containing tree nuts embedded therein to form a horizontal structural layer.

The mixture 30 is then rolled flat, such as with a sheet roller or slab extruder, or molded into its final snack piece form such as with a rotary molder or a compression dye form roller. Preferably, the thickness of the mixture is less than the width of the nut slices, and the thickness of the nut slices is less than the thickness of the mixture. The nut slices thus provide a horizontal structural layer that provides structural reinforcement to the vegetable cluster 50 as a whole, increasing the structural integrity of the cluster 50 by providing foundations and surface area to which the binding syrup may use for large surface area particle attachment. FIG. 10 is a top schematic view of a section of a rolled-out mixture containing tree nuts 12 embedded therein to form a horizontal structural layer.

Vegetable Cluster(s)

The mixture 30 produced by the mixers 63 is provided to one or more manipulator 64 which functions to render the form of the vegetable cluster 50, or more commonly a plurality of vegetable clusters 50. FIGS. 11-18 are various views of exemplary vegetable clusters 50 produced via or during one or more of the processes described herein. In accordance with the descriptions herein, the vegetable cluster 50 is a small group, bunch, conglomeration, or the like of a vegetable cluster component 10, optional tree nut component 12, and optional accessory ingredients 14 that are held together by the binder component 20.

In at least some embodiments, the clusters 50 are produced by baking the mixture 30. Baking the mixture results in many chemical reactions, as well as extracts moister from the cluster, and when cooling, causes the binder component 20 to harden, while the soluble fiber in the binder component 20 serves to reinforce the binder syrup (similar in some ways to the use of metal rebar to reinforce concrete). When used, the tree nut slices 12 (or in some cases whole nuts) provide additional structural integrity by serving as a horizontal deck to which the vegetable component 10 and optional accessory ingredients are bound by the hardened binder syrup.

The cluster 50 is the resultant product or shape of the manufactured vegetable snack-food. The cluster 50 is formed when the mixture 30 is manipulated by mechanical manipulators 64 in a high volume manufacturing process 60. When formed using a sheet roller or the like, one or more additional manipulators 64 may be necessary to form the clusters 50. By comparison, when the clusters 50 are formed using a rotary molder, it may not be necessary to use any further manipulators 64 at this stage. The clusters 50 can be made from a single mixture 30 or a plurality of mixtures 30. Thus the process described herein produces a plurality of vegetable snack-food product clusters automatically and in a continuous manner. The clusters 50 may be formed by manipulator(s) 64 before being baked in an oven or otherwise heated, or may be produced, such as by using manipulator(s) 64 to cut, form, or stamp clusters 50 from prepared material, after being baked in an oven or otherwise heated.

Figure 11:
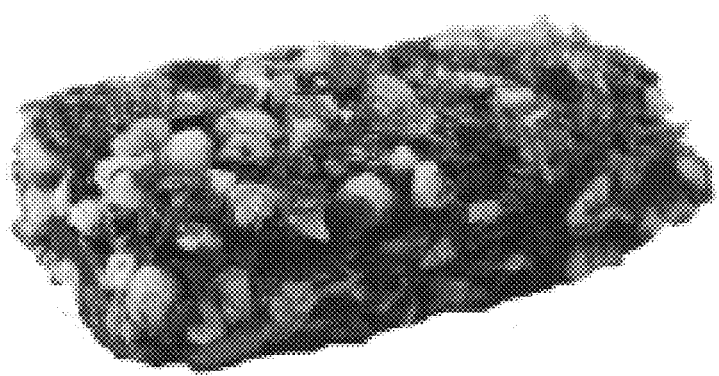
FIG. 11 is perspective view of a cluster bar.
Figure 12:
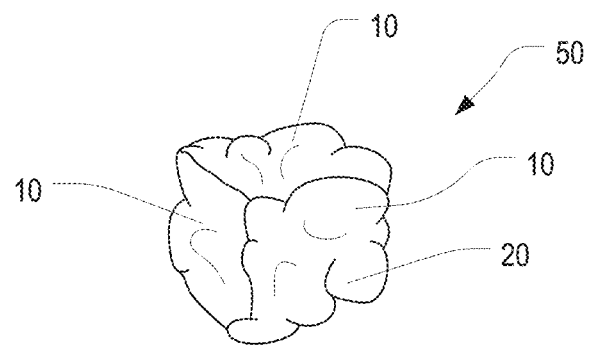
FIG. 12 is a perspective view of a bite-sized cluster piece having a cube or hexahedral shape.
Figure 13:
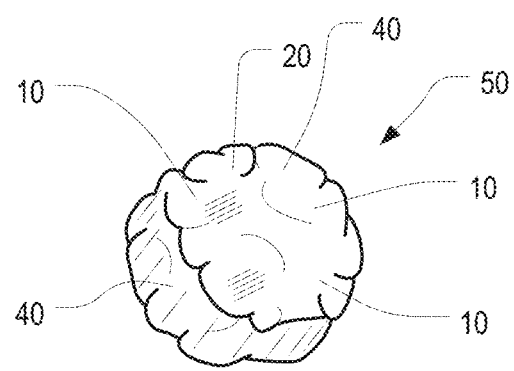
FIG. 13 is a perspective view of a bite-sized cluster piece having a disk shape.
Figure 14:
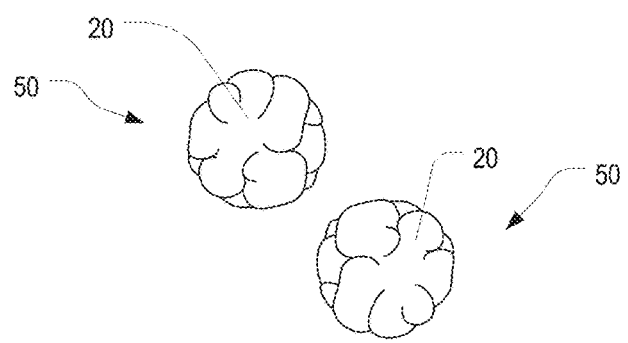
FIG. 14 is a perspective view of a bite-sized cluster piece having a spherical shape.
Figure 15:
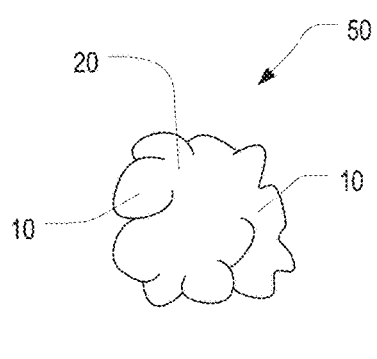
FIG. 15 is a perspective view of a bite-sized cluster piece having an irregular free-form shape.
Figure 16:
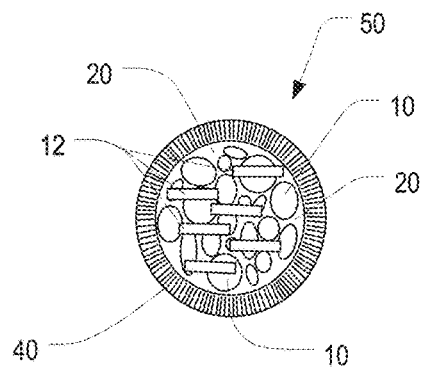
FIG. 16 is a cross-sectional view of a bite-sized cluster piece (including tree nut slices) having a round or spherical shape that is at least partially enrobed with an additive coating.

The finished clusters 50 may be in the form of bite-sized cluster pieces, cluster bars, crisps, chips or the like. Examples of a vegetable cluster 50 held together with a binder component 20, and in at least some cases with tree nut structures, are shown in FIGS. 11-18, wherein FIG. 11 is a cluster bar, FIG. 12 is a perspective view of a bite-sized cluster piece 50 having a cube or hexahedral shape, FIG. 13 is a perspective view of a bite-sized cluster piece 50 having a disk shape, FIG. 14 is a perspective view of a bite-sized cluster piece 50 having a spherical shape, FIG. 15 is a perspective view of a bite-sized cluster piece 50 having an irregular free-form shape, and FIG. 16 is a cross-sectional view of a bite-sized cluster piece 50 (including tree nut slices 12) having a round or spherical shape that is at least partially enrobed with an additive coating 40.

Figure 17:
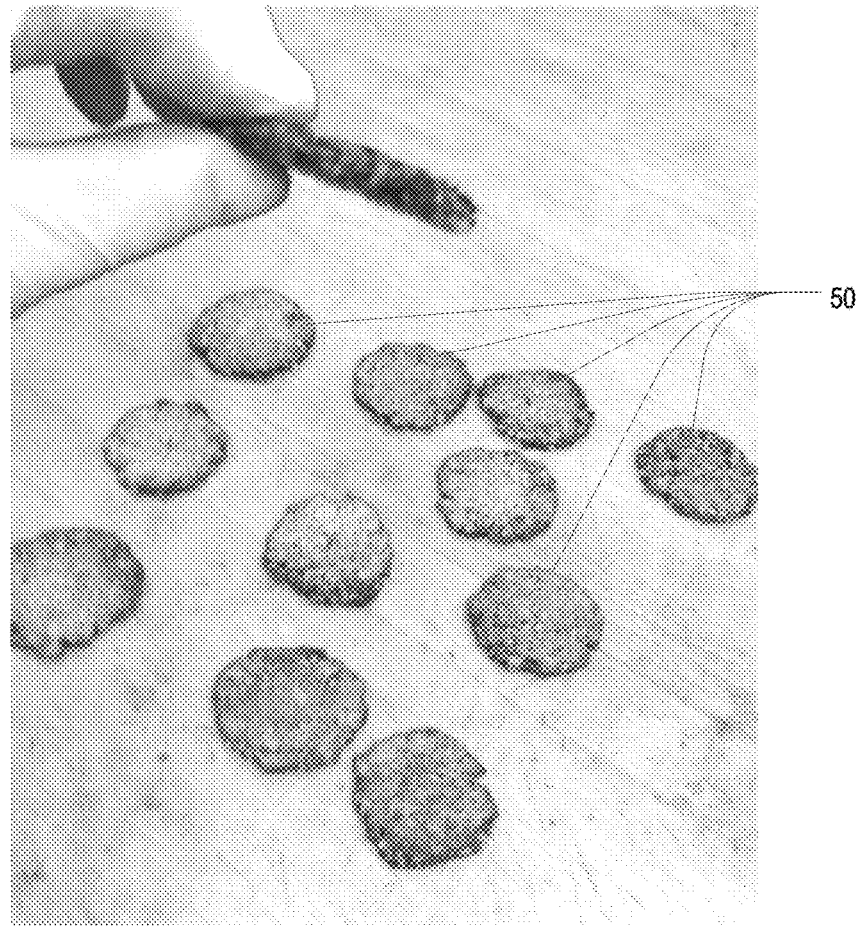
FIG. 17 is a photographic illustration of a multiple cluster pieces having a disk shape with a section diameter of approximately 4 mm and a diameter of approximately 60 mm.
Figure 18:
FIG. 18 is a photographic illustration of two cluster pieces having a bar shape with a section diameter of approximately 4 mm and a length of approximately 100 mm.

Bite-size cluster pieces 50 may be approximately 0.10 to 1.5 inches across when sized. FIG. 17 is a photographic illustration of a multiple cluster pieces 50 having a disk shape with a section diameter of approximately 4 mm and a diameter of approximately 60 mm, while FIG. 18 is a photographic illustration of two cluster pieces 50 having a bar shape with a section diameter of approximately 4 mm and a length of approximately 100 mm. In preferred embodiments, the clusters 50 are between 3 mm and 25 mm thick. Bar-shaped clusters are preferably between 20 mm and 80 mm wide and 20 mm and 100 mm long, while disks and other shapes are preferably between 20 and 80 mm wide and long, and more preferably between 50 mm and 70 mm wide and long.

The finished clusters 50 or other form are then placed in packaging 73 as described below.

Packaged Vegetable Snack Product

The finished clusters 50 are transported to the packaging machine 68 via material handling devices 69. The finished clusters 50 are placed in packaging 73 and the packaging 73 is then sealed air-tight. In at least some embodiments, one or both of the transportation to the packaging machine 68 and placement in the packaging 73 are automatic. In some cases, this packaging phase may also be performed by hand. Once the packaging 73 is sealed, the packaged vegetable snack product 71 has thus been created and exits the high volume manufacturing process 60 through the vegetable snack-food product output 70.

The packaged vegetable snack product 71 is a packaged consumer product, which has packaging 73 that contains a plurality of vegetable clusters 50. The packaged vegetable snack product 71 is the complete snack food product in a shelf-stable format that is contained in packaging 73 which can be sold to a consumer. The packaged vegetable snack product(s) 71 are the vegetable products that are produced in a high volume and continuous manner via the manufacturing process described herein.

Figure 19:
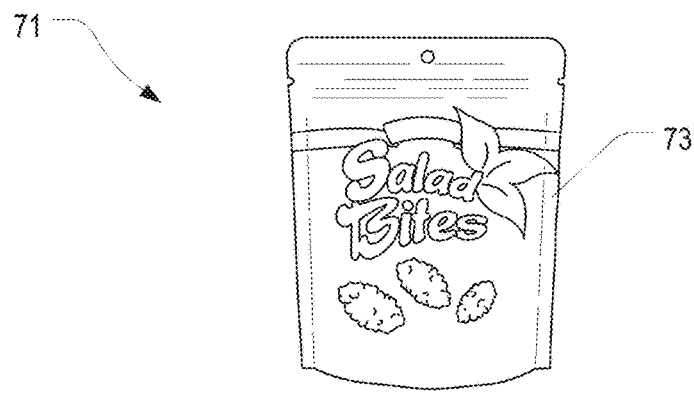
FIG. 19 is a perspective view of one example of a packaged vegetable snack product produced via one or more manufacturing process described herein.
Figure 20:
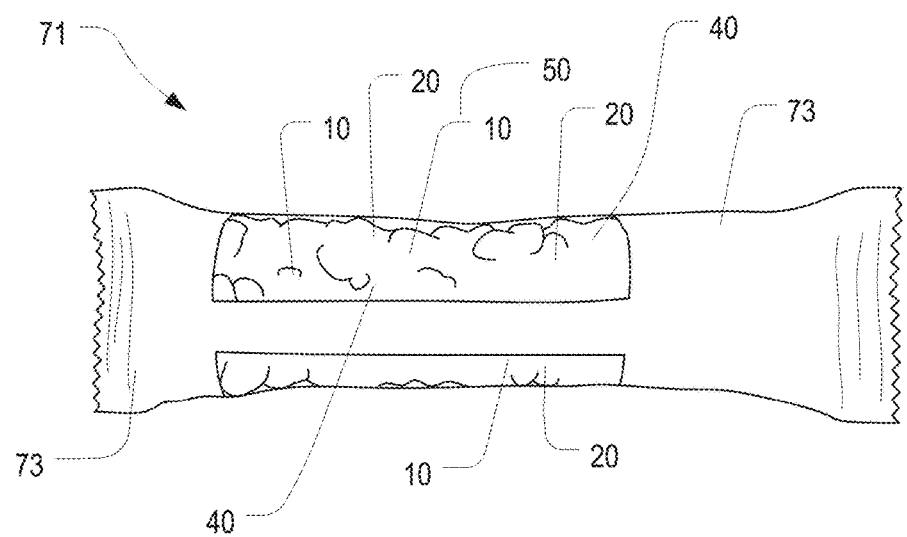
FIG. 20 is a perspective view of another example of a packaged vegetable snack product produced via one or more manufacturing process described herein.

FIG. 19 is a perspective view of one example of a packaged vegetable snack product 71 produced via one or more manufacturing process described herein, and FIG. 20 is a perspective view of another example of a packaged vegetable snack product 71 produced via one or more manufacturing process described herein. In particular, FIG. 19 illustrates packaging that may be particularly suitable for bite-size cluster pieces, and FIG. 20 illustrates packaging that may be particularly suitable for cluster bars. As shown therein, the preferred embodiments of the packaged vegetable snack product 71 are clusters of vegetable food particles with or without an additive coating(s) 40, which are then placed in packaging 73. Via the high volume manufacturing process 60,160,260, the clusters 50 may be placed in said packaging 73 with a packaging machine 68. The packaging 73 is sealed, thus rendering a packaged vegetable snack product 71 that contains a vegetable snack(s) which may be sold to a consumer. The packaging 73 may be of any packaging type where the vegetable clusters 50 are placed in a container or bag which is sealed to prevent food spoilage. Examples of packaging include ridged and flexible packaging such as tins, jars, bags, tubs, cans, tubes, tray, sleeves, bottles, cups and the like. These packaging types may also be combined to render a packaged vegetable snack product 71 that has structural characteristics for shipping, such as the Vegetable Snack may be placed in a ridged tray, which then together are sealed in a clear bag, thus providing a ridged product where the interior may be viewed through the clear bag.

Although in at least one embodiment the vegetable snack food product can be served directly, the resultant snack food is, in most embodiments, then placed in packaging 73 for sale and consumption at a later date. The packaging 73 can have a means to open, consume and close packaging. This method of operation is ideal with consuming the present invention snack while driving a car, camping, sailing or "on-the-go." The packaging in FIG. 19 may be particularly suitable for such use, with such features as a tear-off top and a bottom that may be suitable for supporting the packaging, with the vegetable snack-food product 70 inside, in an upright position.

Manufacturing System

The machines, mechanisms, equipment and devices used in the high volume manufacturing process 60,160,260 and system 100 can be connected together with various material handling devices 69. The material handling devices 69 transport and convey the Vegetable Snack-food through the high volume manufacturing process 60,160,260. The devices 69 may include, but are not limited to, conveyors, sorters, slides, feeders, elevators, augers and screws. The material handling devices 69 transport the various forms of the Vegetable Snack-food through production phases of the process as described herein. Although it may be preferable to use automatic material handling devices 69 whenever possible, it will be appreciated that in at least some embodiments, manual means may also be employed to transfer materials from one process to another within the system 100.

As described and illustrated herein, there are many types of High Volume Manufacturing Processes to manufacture snack foods, including but not limited to, roll slab, cut roll slab, drop extrusion, rotary mold formed, mold formed, injection formed, rod extrusion, extrusion and multiple extrudates. The manipulators 64 may include various devices, equipment, or machines that are used to shape the mixture 30 so as to form cluster(s). The manipulators 64 may include, but are not limited to, slab formers, rollers, slitters, dicers, presses, processors, robots, guillotines, cutters, droppers, formers and extruders.

The high volume manufacturing process 60,160,260 and system also preferably includes temperature controllers 67 to heat, cook, or cool the various components of the vegetable snack-food product at various stages. Such temperature controllers 67 may include cookers, heaters, ovens, refrigerators, coolers, or the like, and may be integrated into a particular machine within the assembly (such as in a heated mixer) or may be a standalone machine within the process or system. The temperature controllers 67 are used to manipulate the temperature such as to cook or cool the various components of the Vegetable snack-food Product at various stages of the high volume manufacturing process 60,160,260. Increasing or decreasing the temperature of the various components may be required for cooking of the cluster comments, or in some cases, be required for forming or manipulating the mixture 30 to form a cluster 50.

Additive Coating

It will be appreciated that one or more additive coatings 40 may be added to the vegetable snack food products at any of various points in the high volume manufacturing processes described herein. The additive coating 40 may be a single food ingredient or a plurality of food ingredients or elements which may be used to layer, enrobe, drizzle, coat, spray, pan, or increase the mass of the cluster 50 with additional food ingredients. The additive coating 40 can be any edible food items or particles which may be used to enhance or vary the flavor of the vegetable snack product.

The additive coating 40 may be whole or particles of foods ingredients such as nuts, fruits, seeds, cereal, legumes, cheese, meat, pastries, bread, cracker, mini cookies, grains, candy, yogurt, candy, syrup, breads, frosting, puffs or the like. The additive coating 40 may also include herbs, oils, fats, spices or seasoning to enhance the taste or chew experience of the vegetable snack product. The additive coating 40 may also be a liquid food product; which solidifies during the production process, such as yogurt or chocolate. The additive coating 40 can be a single food element particle or a plurality of food elements mixed together.

Figure 21:
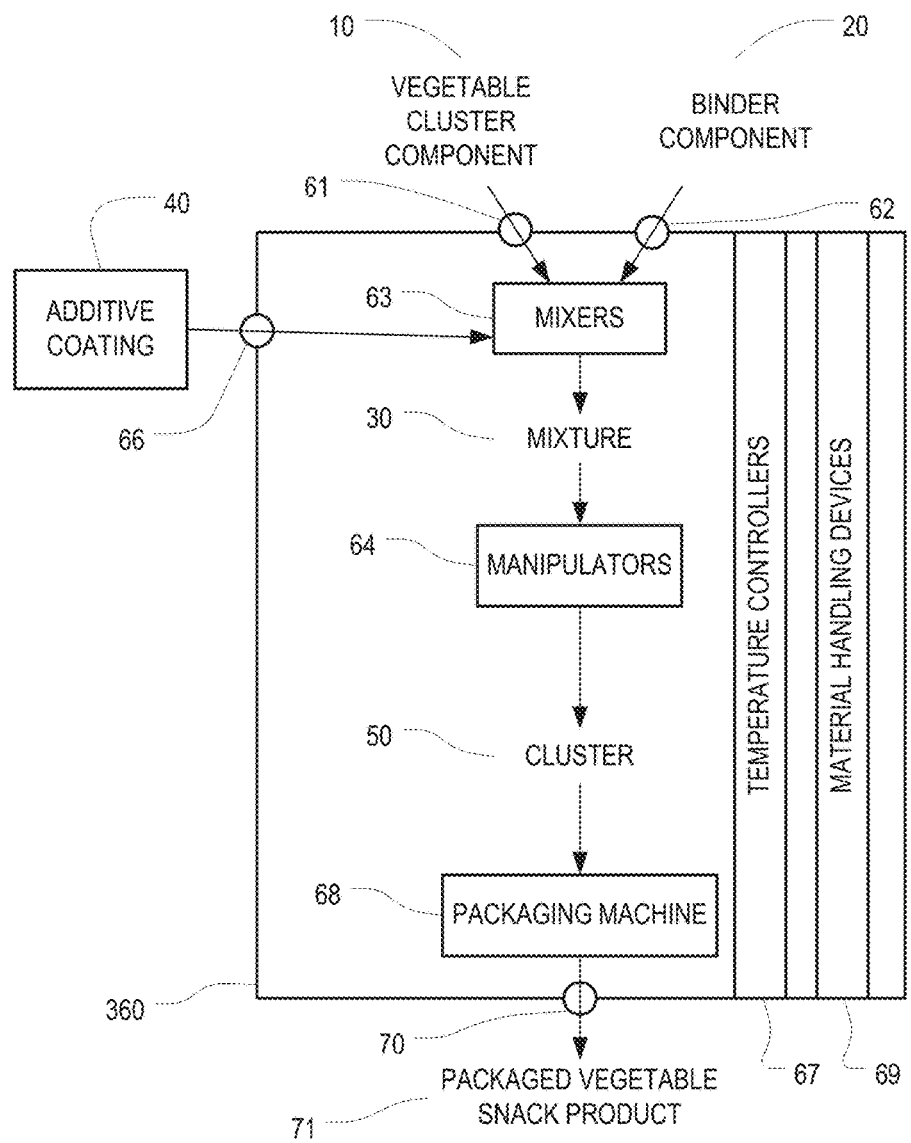
FIG. 21 is a flowchart illustrating a high volume process of manufacturing vegetable snack food products, similar to that of FIG. 1, but wherein an additive coating is introduced in one or more mixers, all in accordance with one or more preferred embodiments of the present invention.
Figure 22:
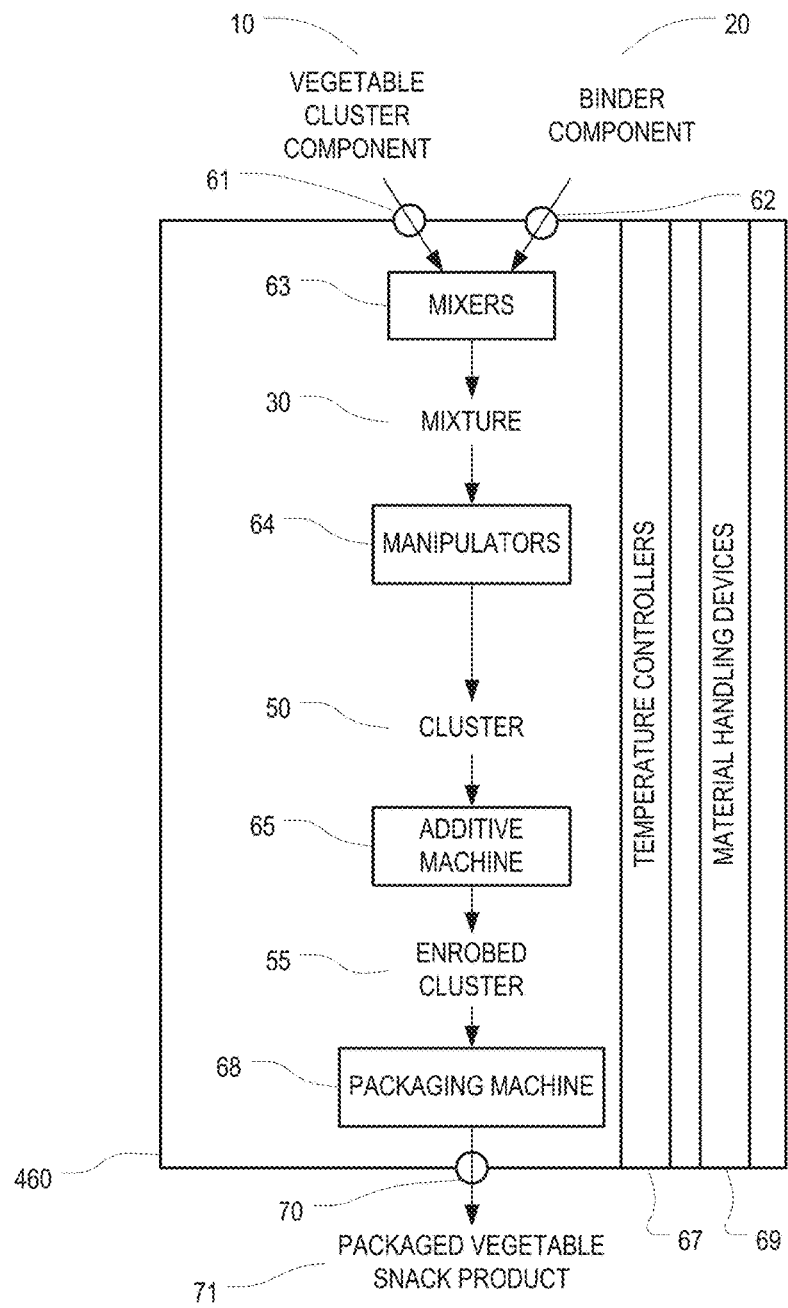
FIG. 22 is a flowchart illustrating a high volume process of manufacturing vegetable snack food products, similar to that of FIG. 1, but wherein the snack food products are enrobed or encapsulated with an additive food material, all in accordance with one or more preferred embodiments of the present invention.
Figure 23:
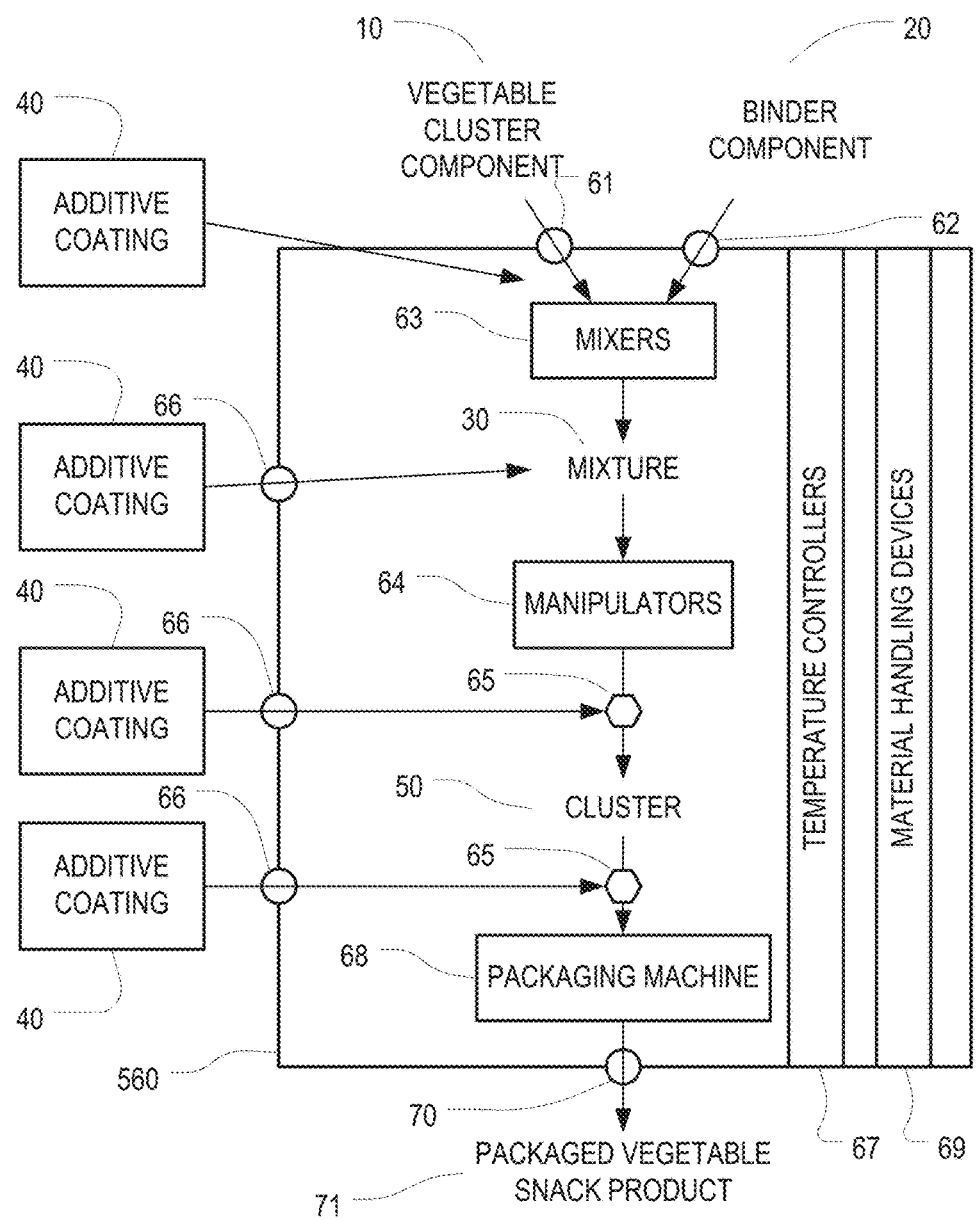
FIG. 23 is a flowchart illustrating a high volume process of manufacturing vegetable snack food products, similar to that of FIG. 1, but wherein one or more additive coatings are added at multiple points therein in accordance with one or more preferred embodiments of the present invention.

The additive coating 40 may be added at different manufacturing phases, or in between phases, pending the desired format result of the vegetable snack. Multiple additive coatings 40 may also be added singularly or separately to the manufacturing process, pending the desired format result of the vegetable snack. In various alternative manufacturing processes, one or more additional coatings 40 may be added to the vegetable cluster component 10, the binder component 20, in one or more of the mixers 63, to the mixture 30; via one or more of the manipulators 64, to the clusters 50, or the like. In this regard, FIG. 21 is a flowchart illustrating a high volume process 360 of manufacturing vegetable snack food products, similar to that of FIG. 1, but wherein an additive coating 40 is introduced in one or more mixers 63, all in accordance with one or more preferred embodiments of the present invention; and FIG. 22 is a flowchart illustrating a high volume process 460 of manufacturing vegetable snack food products, similar to that of FIG. 1, but wherein the snack food products are enrobed or encapsulated with an additive food material, all in accordance with one or more preferred embodiments of the present invention; and FIG. 23 is a flowchart illustrating a high volume process 560 of manufacturing vegetable snack food products, similar to that of FIG. 1, but wherein one or more additive coatings 40 are added at multiple points therein in accordance with one or more preferred embodiments of the present invention. In particular, in the process 360 of FIG. 21, an additive coating 40 is introduced into the mixers 63 via an input 66; in the process 460 of FIG. 22, an additive machine 65 is utilized to enrobe or encapsulate the clusters 50 produced by the manipulators 64, thereby producing enrobed clusters 55 that are then processed by the packaging machine 68; and in the process 560 of FIG. 23, additive coatings 40 are applied directly to the vegetable cluster component 10, introduced via input 66 into the mixture produced by the mixers 63, introduced via input 66 into an additive machine 65 at the output of the manipulators 64, and introduced via input 66 into an additive machine 65 before packaging As shown in the various examples provided herein, one or more mixtures 40 may be added to the clusters 50, such as via an additive machine 65, via layering, fusing, enrobing, spraying, drizzling, bath application, panning or forming said mixtures 40 to the clusters 50 at various locations along the high volume manufacturing process 60. These layers of additive coatings 40 can be used to increase the volume of the clusters 50, alter the taste, appearance, or structural properties of the clusters 50, or the like. Non-limiting examples of how an additive machine 65 may function include: enrobing the vegetable cluster 50 with a mixture 30 after the cluster has been formed, such as is illustrated in FIG. 22; placing a mixture layer on top of the original mixture for an additive process; drizzling a mixture onto the original mixture; dipping the original mixture into a secondary mixture for an additive process; and the like.

Connections of Main Elements and Sub-Elements of Invention

The vegetable cluster component 10, which may be comprised of whole vegetables, particle vegetables, particles of various vegetables are combined together to comprise the vegetable cluster component 10. The vegetables 10 may also be combined with other food items such as botanical fruits, fruits, grains, seeds, cereals, seasoning, spices, grains, or nuts, etc., to comprise the vegetables 10. The vegetables 10 are introduced into the manufacturing process 60 via the vegetable input 61. The tree nuts used for structure reinforcement are introduced to the manufacturing process. The accessory ingredients are used for seasoning and food processing needs. Via the binder input 62, the syrup and/or other binder component 20 is added or add mixed to the vegetables 10 in the mixer(s) 63 together with the tree nuts and accessories, which then form the mixture 30. The vegetable cluster 50 is formed by the operation and action of machines, equipment and devices of the high volume manufacturing process 60 which manipulates and forms the mixture 30 into a plurality of clusters 50 by manipulators 64. Once the clusters 50 have been formed, they are transported to the packaging machine 68 with material handling devices 69 and then are placed into the packaging 73 by the packaging machine 68. Once the clusters 50 are packaged they exit the high volume manufacturing process 60 via the vegetable snack-food product output 70, and become the packaged vegetable snack product 71.

In some embodiments, various components or functions described herein may be combined into single, multi-purpose devices. In other embodiments, all components or functions described herein are separate from each other.

In an additional feature, because the end product is a cluster of vegetables, the cluster may be used as a snack, but may also or alternatively be used as a condiment or garnish, such as being added to salads as a salad topper. Once the user has made their traditional salad, the end product would be added to the salad similar to a crouton.

CONCLUSION

The shelf-stable vegetable snack food product rendered by any of the processes described herein, and provided in the form of the packaged vegetable snack product as described herein, supports nutrition provided by vegetables for the consumer. Such nutritional support provided by the present method and invention may be particularly advantageous when consumers are participating in tasks or activities where personal mobility is an issue, such as in driving a car, sailing, hiking or camping where mixed fresh vegetables are too cumbersome or troublesome to bring, or take too long to prepare. Bringing non-shelf-stable mixed vegetable on a trip or camping is problematic and would cause spoilage if not cared for properly.

Furthermore, because of the advantages provided by a vegetable snack that may be easily consumed by a person carrying out other activities, and the advantages of supporting vegetable nutrition during such activities, one or more methods of the present invention may further include specific marketing or distribution activities aimed at sales to consumers who are likely to participate in such activities.

As described herein, vegetable based snack food products may be manufactured in a high volume manner. Such products may be in a cluster format which may include a bite sized cluster format, cluster bar format, or the like, and in an automatic and continuous manner. Consumer packaging may be provided that allows for on-the-go consumption.

The snack food products advantageously have a high vegetable content, complete with the dietary or nutritional benefits that are provided by vegetables. The vegetables can be in a shelf-stable format, and the finished product can maintain a shelf-stable condition. The vegetables used can also be combined with other food items such as fruits, grains, seeds, cereals, grains, or nuts which collectively can be manufactured in cluster pieces, a cluster bar format, or the like. The clusters may be enrobed with an exterior food coating; they may be fortified with functional ingredients, such as vitamins or supplements.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A high-volume method of manufacturing a vegetable-based cluster-type snack-food product in a thin slab format with an isolated soluble fiber-based binder fiber reinforcement, carried out in a manufacturing line, comprising:
   inputting a supply of a vegetable cluster component to a manufacturing line, wherein the vegetable cluster component predominantly includes whole or pieces of savory and/or salty culinary vegetables, wherein such savory and/or salty culinary vegetables are naturally savory and/or salty or have already had savory mixtures or salt added thereto;
   inputting a supply of one or more accessory ingredients to the manufacturing line, wherein the accessory ingredients provide one or more of a taste function, a preservative function, a filler function, or a stabilizer function;
   inputting a supply of a tree nut component to the manufacturing line to provide structural decking/reinforcement;
   inputting a supply of a binder component to the manufacturing line, wherein the binder component is produced predominantly from, and reinforced with, an isolated soluble fiber;
   mixing a quantity of the supply of the binder component, a quantity of the supply of one or more accessory ingredients, and a quantity of the supply of the tree nut component together with a quantity of the supply of the vegetable cluster component to produce a mixture; and
   manipulating the mixture of binder component, accessory component, decking component, and vegetable cluster component, wherein the manipulating step includes slab rolling the mixture to produce a plurality of slab-shaped vegetable snack-food product clusters that have a thickness of no more than 25 mm, a width of at least 20 mm, and a length of at least 20 mm;
   wherein the slab-shaped vegetable snack-food product clusters are bound together and reinforced by the isolated soluble fiber-reinforced binder component and the structural decking of the tree nut component.

2. The method of claim 1, wherein the vegetable cluster component includes pieces of leafy green vegetables.

3. The method of claim 2, wherein the leafy green vegetables include at least one of spinach, kale, and parsley.

4. The method of claim 1, further comprising a step of heating the binder component to facilitate binding the vegetable snack-food product clusters together.

5. The method of claim 4, wherein the heating step includes heating the binder component to at least 100 degrees F.

6. A high-volume method of manufacturing a shelf-stable vegetable-based cluster-type snack-food product with an isolated soluble fiber-based binder, carried out in a manufacturing line, comprising:
   inputting a supply of a vegetable cluster component to a manufacturing line, wherein the vegetable cluster component predominantly includes whole or pieces of savory and/or salty culinary vegetables, wherein such savory and/or salty culinary vegetables are naturally savory and/or salty or have already had savory mixtures or salt added thereto;
   inputting a supply of a binder component to the manufacturing line, wherein the binder component is produced predominantly from an isolated soluble fiber;

mixing a quantity of the supply of the binder component together with a quantity of the supply of the vegetable cluster component to produce a mixture; and manipulating the mixture of binder component and vegetable cluster component to produce a plurality of vegetable snack-food product clusters, wherein the manipulating step includes slab rolling the mixture of binder component and vegetable cluster component to produce a plurality of slab-shaped vegetable snack-food product clusters;

wherein the vegetable snack-food product clusters are bound together by the isolated soluble fiber of the binder component without relying upon crystallization of sugar or glucose polymers in the binder component.

7. The method of claim 1, wherein the tree nut component includes shaped pieces of tree nuts.

8. The method of claim 1, wherein the tree nut component includes pieces of more than one type of tree nut.

9. The method of claim 1, wherein the tree nut component includes at least one tree nut selected from the group including almonds, Brazil nuts, cashews, chestnuts, filberts/hazelnuts, macadamia nuts, pecans, pistachios, pine nuts, and walnuts.

\* \* \* \* \*